(12) United States Patent
Zappella et al.

(10) Patent No.: US 12,165,082 B1
(45) Date of Patent: Dec. 10, 2024

(54) HYPERPARAMETER OPTIMIZATION WITH OPERATIONAL CONSTRAINTS

(71) Applicant: Amazon Technologies, Inc., Seattle, WA (US)

(72) Inventors: Giovanni Zappella, Berlin (DE); Valerio Perrone, Berlin (DE); Iaroslav Shcherbatyi, Berlin (DE); Rodolphe Jenatton, Berlin (DE); Cedric Philippe Archambeau, Berlin (DE); Matthias Seeger, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 447 days.

(21) Appl. No.: 16/915,610

(22) Filed: Jun. 29, 2020

(51) Int. Cl.
*G06N 7/01* (2023.01)
*G06N 3/08* (2023.01)
*G06N 20/00* (2019.01)

(52) U.S. Cl.
CPC ............... *G06N 7/01* (2023.01); *G06N 3/08* (2013.01); *G06N 20/00* (2019.01)

(58) Field of Classification Search
CPC .......... G06N 7/005; G06N 20/00; G06N 3/08; G06N 7/01
See application file for complete search history.

(56) References Cited

U.S. PATENT DOCUMENTS

| | | | | |
|---|---|---|---|---|
| 11,157,812 B2 * | 10/2021 | McCourt | ................... | G06N 3/08 |
| 11,748,615 B1 * | 9/2023 | Wu | .......................... | G06N 3/08 706/25 |
| 2014/0358831 A1 * | 12/2014 | Adams | ................... | G06N 7/005 706/20 |
| 2019/0087411 A1 * | 3/2019 | Komine | ................ | G06F 40/216 |
| 2019/0155633 A1 * | 5/2019 | Faulhaber, Jr. | .......... | G06N 5/04 |
| 2019/0370684 A1 * | 12/2019 | Gunes | .................... | G06N 20/00 |
| 2020/0410386 A1 * | 12/2020 | Loving | ................ | G06K 9/6218 |
| 2021/0081837 A1 * | 3/2021 | Polleri | ....................... | G06F 8/41 |
| 2021/0174246 A1 * | 6/2021 | Triplet | ..................... | G06N 7/01 |

OTHER PUBLICATIONS

Stamoulis et al., "HyperPower: Power- and Memory-Constrained Hyper-Parameter Optimization for Neural Networks", Mar. 2018, 2018 Design, Automation & Test in Europe Conference & Exhibition (DATE), pp. 19-24. (Year: 2018).*

(Continued)

*Primary Examiner* — Randall K. Baldwin
(74) *Attorney, Agent, or Firm* — Robert C. Kowert; Kowert, Hood, Munyon, Rankin & Goetzel, P.C.

(57) ABSTRACT

Hyperparameters for tuning a machine learning system may be optimized using Bayesian optimization with constraints. The hyperparameter optimization may be performed for a received training set and received constraints. Respective probabilistic models for the machine learning system and constraint functions may be initialized, then hyperparameter optimization may include iteratively identifying respective values for hyperparameters using analysis of the respective models performed using an acquisition function implementing entropy search on the respective models, training the machine learning system using the identified values to determine measures of accuracy and constraint metrics, and updating the respective models using the determined measures.

17 Claims, 12 Drawing Sheets

(56) References Cited

OTHER PUBLICATIONS

Chen et al., "Constraint-Aware Deep Neural Network Compression", V. Ferrari et al. (Eds.): ECCV 2018, LNCS 11212, pp. 409-424 2018. (Year: 2018).*
Stamoulis et al., "Single-Path Mobile AutoML: Efficient ConvNet Design and NAS Hyperparameter Optimization", May 2020, arXiv:1904.02877. (Year: 2020).*
Yin, Zixuan, Warren Gross, and Brett H. Meyer. "Probabilistic sequential multi-objective optimization of convolutional neural networks." 2020 Design, Automation & Test in Europe Conference & Exhibition (DATE). IEEE, Mar. 2020: 1055-1060 (Year: 2020).*
Preuveneers, Davy, Ilias Tsingenopoulos, and Wouter Joosen. "Resource usage and performance trade-offs for machine learning models in smart environments." Sensors 20.4 (Feb. 2020): 1176. (Year: 2020).*
Lee, Eric Hans, et al. "Cost-aware Bayesian optimization." arXiv preprint arXiv:2003.10870 (Mar. 2020). (Year: 2020).*
Li, Yan, et al. "CAPES: Unsupervised storage performance tuning using neural network-based deep reinforcement learning." Proceedings of the international conference for high performance computing, networking, storage and analysis. 2017. (Year: 2017).*
Arakaki, Takafumi, Gregory Barello, and Yashar Ahmadian. "Inferring neural circuit structure from datasets of heterogeneous tuning curves." PLoS Computational Biology 15.4 (2019): e1006816. (Year: 2019).*
Zi Wang, et al., "Max-value Entropy Search for Efficient Bayesian Optimization", arXiv:1703.1968v3, Jan. 2, 2018, pp. 1-12.
Niranjan Srinivas, et al., "Information-Theoretic Regret Bounds for Gaussian Process Optimization in the Bandit Setting", IEEE Transactions on Information Theory, vol. 58, No. 5, May 2012, pp. 1-16.
Katharina Eggensperger, et al., "Efficient Benchmarking of Hyperparameter Optimizers via Surrogates", Association for the Advancement of Artificial Intelligence, 2015, pp. 1-7.
Setareh Ariafar, et al., "ADMMBO: Bayesian Optimization with Unknown Constraints using ADMM", Journal of Machine Learning Research 20, Published May 2-19, pp. 1-26.
Michael A. Gelbart, et al., "Bayesian Optimization with Unknown Constraints", arXiv:1403.5607v1, Mar. 22, 2014, pp. 1-14.
Jasper Snoek, et al., "Scalable Bayesian Optimization Using Deep Neural Networks", arXiv:1502.05700v2, Jul. 13, 2015, pp. 1-13.
Jose Miguel Hernandez-Lobato, et al., "A General Framework for Constrained Bayesian Optimization using Information-based Search", arXiv:1511.09422v2, Journal of Machine Learning Research 17, Sep. 4, 2016, pp. 1-53.
Aaron Klein, et al., "Meta-Surrogate Benchmarking for Hyperparameter Optimization", arXiv:1905.12982v2, Nov. 24, 2019, pp. 1-17.
Victor Picheny, et al., "Bayesian optimization under mixed constraints with a slack-variable augmented Lagrangian", 20th Conference on Neural Information Processing Systems (NIPS 2-16), 2016, pp. 1-9.
Remi Bardenet, et al., "Collaborative hyperparameter tuning", Proceedings fo the 30th International Conference on Machine Learning, JMLR: W&CP vol. 28, 2013, pp. 1-9.
Bobak Shahriari, et al., "Taking the Human Our of the Loop: A Review of Bayesian Optimization", Proceedings of the IEEE, vol. 104, No. 1, 2015, pp. 148-175.
James Bergstra, et al., "Random Search for Hyper-Parameter Optimization", Journal of Machine Learning Research 13, 2012, pp. 281-305.
Christopher M. Bishop, "Pattern Recognition and Machine Learning", Springer, 2006, pp. 1-758.
Benjamin Letham, et al., "Constrained Bayesian Optimization with Noisy Experiments", International Society for Bayesian Analysis, 2019, vol. 14, No. 2, Retrieved from https://doi.org/10.1214/18-BA1110, pp. 495-519.
Jacob R. Gardner, et al., "Bayesian Optimization with Inequality Constraints", Proceedings of the 31st International Conference on Machine Learning, JMLR: W&CP vol. 32, 2014, pp. 1-10.
Philipp Hennig, et al., "Entropy Search for Information-Efficient Global Optimization", Journal of Machine Learning Research 13, 2012, pp. 1809-1837.
Daniel Hernandez-Lobato, et al., "Predictive Entropy Search for Multi-objective Bayesian Optimization", Proceedings of the 33rd International Conference on Machine Learning, JMLR: W&CP, vol. 48, 2016, pp. 1-10.
Jose Miguel Hernandez-Lobato, et al., "Predictive Entropy Search for Bayesian Optimization with Unknown Constraints", Proceedings of the 32nd International Conference on Machine Learning, JMLR: W&CP, vol. 37, 2015, pp. 1-9.
Donald R. Jones, et al., "Efficient Global Optimization of Expensive Black-Box Functions", Journal of Global Optimization 13, 1998, pp. 455-492.
Kirthevasan Kandasamy, et al., "Parallelised Bayesian Optimization via Thompson Sampling", Proceedings of the 21st International Conference on Artificial Intelligence and Statistics (AISTATS), 2018, pp. 1-10.
Thomas P Minka, "Expectation Propagation for Approximate Bayesian Inference", Statistics Department, Carnegie Mellon University, pp. 1-8.
C. E. Rasmussen, et al., "Gaussian Process for Machine Learning", Gaussian Processes for Machine Learning, 2006, pp. 1-266.

* cited by examiner

HYPERPARAMETER OPTIMIZATION WITH OPERATIONAL CONSTRAINTS

BACKGROUND

In machine learning systems, optimizing hyperparameters, parameters whose values are set before the training is performed, is a crucial step in developing accurate and performant machine learning models. This optimization, however, is challenging as various operational metrics and behaviors of the machine learning system and resultant models cannot be known a priori and evaluating machine learning system training for a specific training data set may be costly and expensive. Furthermore, this process is complicated by a need to consider model-specific constraints. Consider the problem of tuning hyperparameters of a large neural network to minimize validation error while meeting a minimum execution latency constraint. This validation error is best considered a black-box in that it cannot be known beforehand in an analytical form nor can it be analyzed in consideration of the execution latency constraint.

Figure 1:
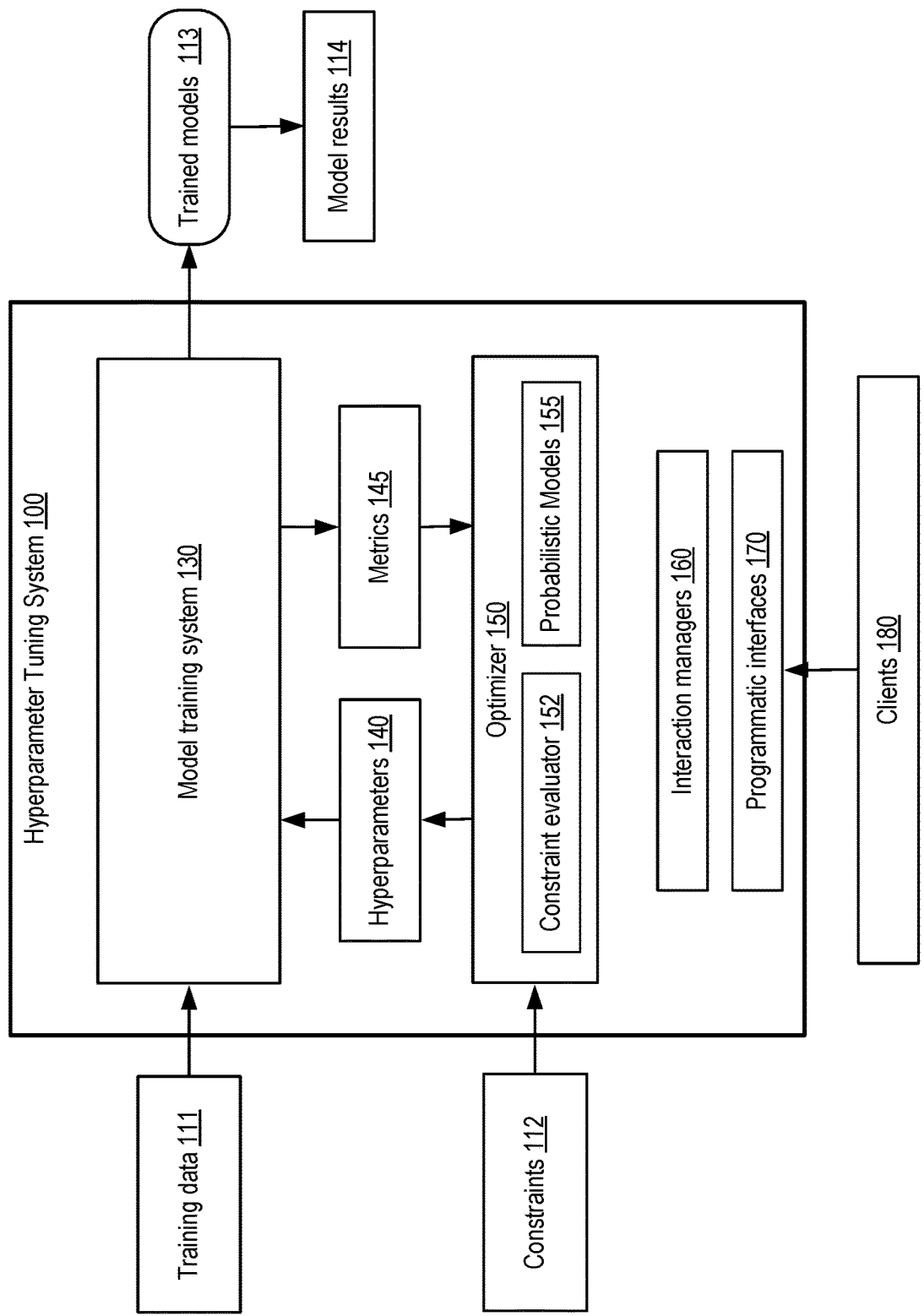
FIG. 1 illustrates an example system environment in which optimization of hyperparameters for training of a machine learning system with constraints may be employed, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for optimization of hyperparameters with performance constraints are described. In various embodiments, optimization of hyperparameters with performance constraints may be implemented using a constrained Maximum value Entropy Search (cMES) technique for implementing Bayesian optimization of hyperparameters. According to some embodiments, resources of a machine learning system may be used to automatically determine optimal hyperparameters to train a machine learning model. In some embodiments, one or more constraints and an indication of a training data set to be used for a machine learning model may be obtained at the service—for example, a storage location or a universal resource locator (URL) from which various observation records of the training data can be read may be obtained. A hyperparameter optimizer may then use the resources of the machine learning system to determine optimal parameters for training the machine learning system to generate a trained model.

Bayesian Optimization of Hyperparameters

Given that a function $y(x): X \rightarrow R$ represents a black-box function over a set $X \subset Rp$ for which it is desired to identify a minimum value. In some embodiments, for example, $y(x)$ may be the validation error of a deep neural network (DNN) as a function of hyperparameters x (e.g., learning rate, number of layers, dropout rates). Each evaluation of $y(x)$ requires training the network which may be a costly process, thus motivating a goal to find a minimum value of $y(x)$ using as few evaluations of the black-box function as possible. Bayesian optimization (BO) is an efficient approach to find a minimum of the black-box function $y(x)$, where $x \in X$. A Gaussian process surrogate model may be created for $y(x)$ and iteratively updated by evaluating the black-box function at new points. Points are selected by optimizing an acquisition function which trades off exploration and exploitation. For example, for a black-box function of the validation error of a deep neural network (DNN) as a function of hyperparameters x, the DNN may be trained using newly selected points to determine various operational metrics.

Conventional surrogate models and acquisition functions, however, are not designed to integrate optimization constraints. To integrate optimization constraints, an acquisition function is needed that optimizes surrogate models subject to the one or more constraints. For simplicity, only one constraint $c(x) \leq \delta$ is considered, but this is not intended to be limiting, and embodiments implementing multiple constraints may be envisioned. As constraints may be conditionally independent, an extension to techniques disclosed herein to enable multiple constraints is straightforward.

The constrained optimization problem may be defined as follows:

$$y^* = \min_{x \in X}\{y(x) \| c(x) \leq \delta\}$$

where $\delta \in R$ is a confidence parameter. The latent functions $y(x)$ and $c(x)$ are assumed to be conditionally independent in the surrogate model with different Gaussian process (GP) priors placed on them. This may be accomplished by selecting one or more points at random for which to evaluate the black-box function to generate the different GP priors.

In some embodiments, constraints may be real-valued while in other embodiments constraints may be binary. For real-valued constraints, both latent functions may be represented as GPs with Gaussian noise. However, real-valued constraints do not cover important use cases of constrained hyperparameter optimization. For example, if training a neural network fails with an out-of-memory (OOM) error, the amount of memory requested just before the failure cannot be easily observed nor is the amount of memory available on the hosting compute instance necessarily known in order to calibrate $\delta$. Covering such use cases requires handling binary feedback on $c(x)$. An evaluation returns $z_y \sim N(z_y | y(x); \alpha_y^{-1})$ $z_e \in \{-1, +1\}$ where $z_e = -1$ for a feasible and $z_e = +1$ for an unfeasible point. The latent constraint function $c(x)$ may never be observed directly. $z_e \sim \alpha(z_e c(x))$ where $\alpha(t) = 1/(1+e^{-t})$ is the logistic sigmoid, however other choices are possible and this assumption is not intended to be limiting. The constrained optimization problem may then be defined as follows:

$$y^* = \min_{x \in X}\{y(x) \| P(zc = +1 | x) = \sigma(c(x)) \leq \sigma(\delta)\}.$$

The confidence parameter $\sigma(\delta) \in (0,1)$ controls the size of the (random) feasible region for defining $y^*$. Finally, note that in the example of OOM training failures, the criterion observation $z_y$ is obtained only if $z_c = -1$; if training fails a validation error is not obtained for the evaluated point.

A well-known method for implementing constrained Bayesian optimization is constrained Expected Improvement (cEI). If the constraint is denoted by $c(x) \leq 0$, a separate regression model is used to learn the constraint function $c(x)$ (typically a GP), and the well-known Expected Improvement (EI) acquisition function is modified in two ways. First, the expected amount of improvement of an evaluation is computed only with respect to the current feasible minimum. Second, hyperparameters with a large probability of satisfying the constraint are encouraged by optimizing cEI$(x) = P\{c(x) \leq 0\} EI(x)$, where $P\{c(x) \leq 0\}$ is the posterior probability of x being feasible under the constraint model, and EI(x) is the standard EI acquisition function. Several issues with cEI exist. First, the current feasible minimum has to be known, which is problematic if all initial evaluations are unfeasible. A workaround is to use a different acquisition function initially. In addition, the probability of constraint violation is not explicitly accounted for in cEI.

Another approach is to extend Predictive Entropy Search (PES) to the constrained case. Constrained PES (cPES) can outperform cEI and does not require the workarounds mentioned above. However, it is complex to implement, expensive to evaluate, and unsuitable for binary constraint feedback.

Max-Value Entropy Search with Constraints

Constrained Max-value Entropy Search (cMES) is an extension of Max-value Entropy Search (MES) supporting both real-valued and binary constrained feedback. Presented herein is a discussion of the binary constrained feedback case.

Initially, $y(\bullet)$ and $c(\bullet)$ may have independent GP priors, with mean zero and covariance functions $k_y(x; x')$ and $k_c(x; x')$ respectively. Moreover, data $D = \{x_i, z_{yi}, z_{ci} | i = 1, \ldots, n\}$ may already been acquired. Since $z_{yi} \sim N(y(x_i); \alpha_y^{-1})$, the posterior for $y(\bullet)$ is a GP with marginal mean and variance given by:

$$\mu_y(x) = k_y(x)^T M^{-1} z_y,$$

$$\sigma_y^2(x) = k_y(x,x) - k_y(x)^T M^{-1} k_y(x)$$

where $z_y = |z_{yi}| \in R^n$, $M = |k_y(x_i; x_j)| + \alpha^{-1} I \in R^{n \times n}$, and $k_y(x) = |k_y(x; x_i)| \in R^n$.

For real-valued constraint feedback (i.e., $z_{ci} \in R$), the same formalism for the posterior over $c(\bullet)$ may be used. In the binary feedback case, expectation propagation is used to approximate the posterior for $c(\bullet)$ by a GP. Subsequently, posterior marginals of these processes, at input x by $P(y) = N(y | \mu_y, \sigma_y^{2j})$ and $P(c) = N(c | \mu_c, \sigma_c^2)$, ignore the conditioning on D and x for convenience.

The unconstrained MES acquisition function is given by:

$$I(y, y^*) = H[P(y)] - E_{y^*}[H[P(y | y^*)]]$$

where the expectation is over $P(y^* | D)$, and $y^* = \min_{x \in X} y(x)$. Here, $H[P(y)] = \int P(y)(-\log P(y)) dy$ denotes the differentiable entropy and $P(y | y^*) \propto P(y) I_{\{y \geq y^*\}}$ is a truncated Gaussian. First, it should be noted that this is a simplifying assumption. In PES the related distribution $P(y | x^*)$ is approximated, where $x^*$ is the argmin. Several local constraints on $y(\bullet)$ at $x^*$ are taken into account, such as $\nabla_x^* y = 0$. This is not done in MES and simplifies derivations considerably. Second, the expectation over $y^*$ may be approximated by Monte Carlo sampling.

The cMES acquisition function is a generalization of MES. For binary feedback, this extension modifies the mutual information criterion as follows:

$$I((y, z_c); y^*) = H[P(y, z_c)] - E_{y^*}[H[P(y, z_c | y^*)]]$$

where $y^*$ is the constrained minimum. Note that a noise-free y used in place of $z_y$ for simplicity.

Entropy Difference for Fixed $y^*$

The entropy difference $H[P(y, c)] - H[P(y, c | y^*)]$ may be expressed in terms of $$\gamma_c = (\delta - \mu_c)/\sigma_c, \gamma_y = (y^* - \mu_y)/\sigma_y$$

$$Z_c = E[I\{c \leq \delta\}] = \Phi(\gamma_c), Z_y = E[I\{y \leq y^*\}] = \Phi(\gamma_y)$$

where $\Phi(t) = E[I\{n \leq t\}]$ and $n \sim N(0, 1)$ is the cumulative distribution function for a standard normal variate. For example, $Z=E[K(y,c)]=1-Z_cZ_y$. For a binary response $z_c \in \{-1, +1\}$ less information about y* is obtained. Since $P(zc|c)=\sigma(z_c c)$ is not Gaussian:

$$Q(z_c)Q(c|z_c) \approx P(z_c|c)P(c), zc \in \{-1,+1\}$$

where the $Q(c|z_c)$ are Gaussians. Laplace's approximation may be used, in particular the accurate approximation $Q(z_c) \approx P(z_c)$. Now:

$$P(y,z_c|y^*) = \int P(y)P(z_c|c)P(c)K(y,c)dc$$

$$\approx \int P(y)Q(z_c)Q(c|z_c)K(y,c)dc$$

$$= P(y)Q(z_c)\vec{K}(y,z_c),$$
$$\vec{K}(y,z_c)=1-I_{\{y=y^*\}}F(z_c), F(z_c)=E_{Q(c|zc)}[I_{\{c \leq \delta\}}]$$

While $\vec{K}(y, z_c)$ is not an indicator, it is piece-wise constant, allowing for an analytically tractable computation of the entropy difference:

$$H[P(y)]+H[Q(z_c)]-H[P(y,z_c|y^*)]=-\log Z-B(\gamma_y h(-\gamma_y)/2+_c^{l-1}E_Q[(1-F(z_c))(-\log(1-F(z_c))+(F(z_c)-_c)\log Q(z_c)]),$$

$$B=Z_{yc}Z^{-1}=(\exp(-\log Z_y-\log_c)-1)^{-1}$$

where $F(z_c)=E_Q(c|z_c)[I\{c \leq \delta\}]$, $_c=E_Q[F(z_c)]$, and $Z=1-Z_yc$. Function $h(x)=N(x|0,1)=\Phi(-x)$ denotes the hazard function for the standard normal distribution. All terms depending on c and $z_c$ are independent of y* and can therefore be predetermined.

Sampling

In the constrained case, sampling is performed from $P(y^*|D)$, where $y^*=\min_{x \in X}\{y(x)||c(x) \leq \delta\}$. Here, y(•) and c(•) are posterior GPs conditioned on the current data D. This primitive is known as Thompson sampling for a GP model. For commonly used infinite-dimensional kernels drawing exact sample functions from these GPs is intractable, let alone to solve the conditional optimization problem for y*.

A finite-dimensional random kitchen sink (RKS) approximation may be used to draw approximate sample paths and the constrained problem is solved for these. Since the RKS basis functions are nonlinear in x, so are the objective and constraint functions, and solving for y* requires complex operations. Moreover, each kernel function has a different RKS expansion, and the latter is not readily available for many kernels used in practice. Simpler approach may be used to provide a tractable approximation of the cumulative distribution function (CDF) of y*, but this results in poor overall performance as shown below in FIG. 5. An alternative is to restrict sampling to a finite set X' but then draw jointly dependent samples of y(X') and c(X') respectively, based on which y* (restricted to X') is trivial to compute. While joint sampling scales cubically in the size of X', sampling takes less than a second for |X|=2000.

Example System Environment

FIG. 1 illustrates an example system environment in which optimization of hyperparameters for training of a machine learning system with constraints may be employed, according to at least some embodiments. As shown, hyperparameter tuning system 100 may comprise various resources and artifacts and may be implemented as a stand-alone machine learning system or as part of a network-based service that performs machine learning, such as a machine learning service, as discussed below with regard to FIG. 11. In various embodiments, hyperparameter tuning system 100 may include model training system 130. Clients 180 of the machine learning system 110 may submit various types of requests to the machine learning system 110, via a set of programmatic interfaces 170 such as web-based interfaces, command-line tools and application programming interfaces, including for example requests to train and/or execute machine learning models with constraints. Interaction managers 160 of the machine learning system 110 110, comprising one or more computing devices, may act as intermediaries between the clients and the service in the depicted embodiment. As such, the interaction managers 160 may receive the programmatic requests submitted by the clients, parse the requests, distribute the work operations indicated in the programmatic requests to other components of the machine learning system 110, collect responses generated by the internal components, and provide the responses to the clients in the appropriate formats.

Given a request to train the model training system 130 using training data 111 and constraints 112 to produce trained models 113 usable to produce model results 114, a Bayesian optimizer 150 may employ probabilistic models 155, in combination with an analysis of Constraints 112 and Metrics 145 at Constraint evaluator 152, to determine hyperparameters 140 and direct the model training system 130 to use the determined set of hyperparameters to perform a training operation using the training data 111 to generate additional metrics 145. The Bayesian optimizer 150 may then use the generated metrics 145 to update the probabilistic models 155 and may further iterate on the above steps to generate an optimized set of hyperparameters 140 for the constraints 112. These optimized hyperparameters 140 may then be used by the machine learning system to generate the trained model 113.

Example Bayesian Optimization of Hyperparameters with Constraints

Figure 2:
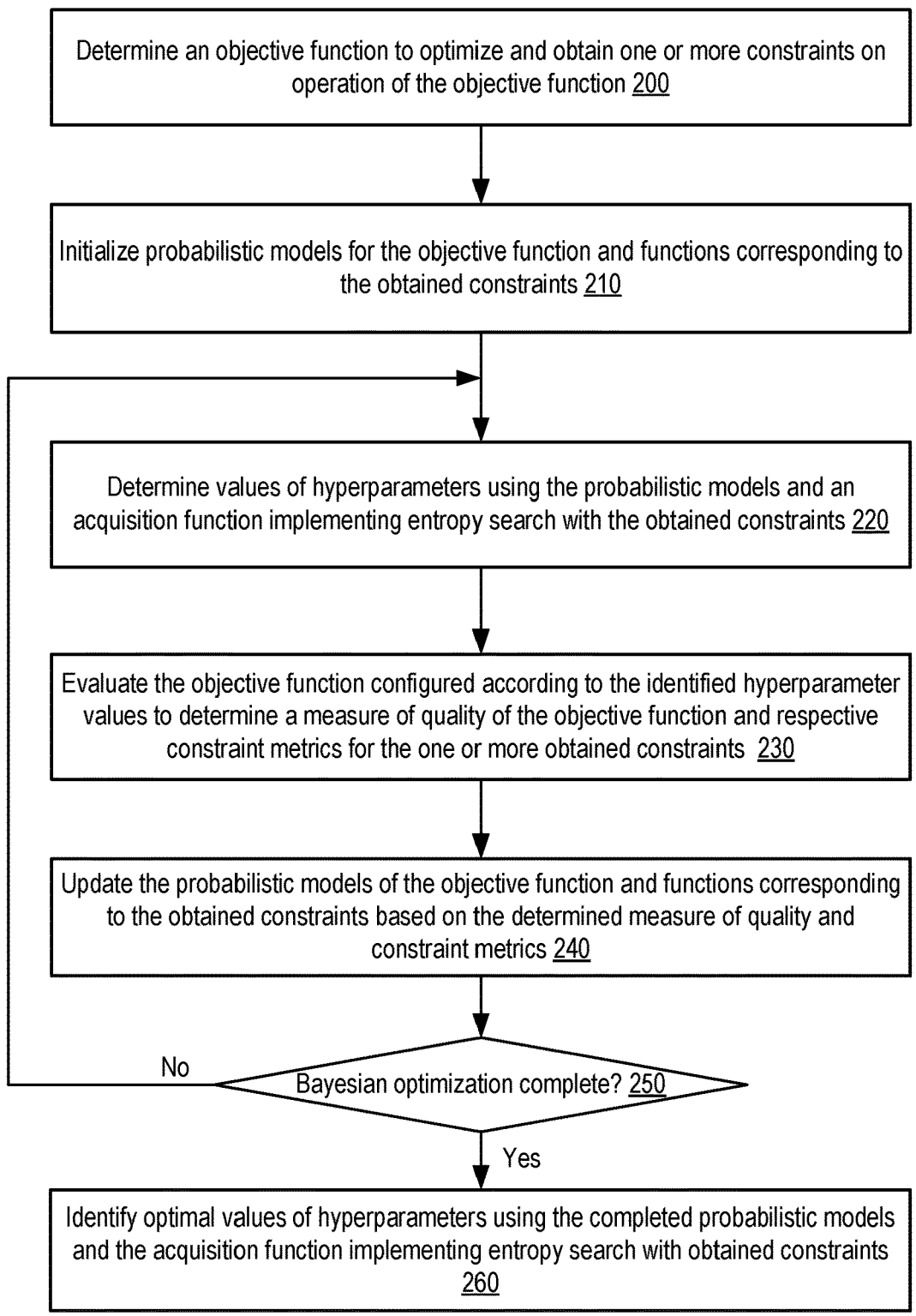
FIG. 2 is a high-level flowchart of an optimization of hyperparameters for an objective function with constraints, according to some embodiments.

FIG. 2 is a high-level flowchart of a Bayesian optimization of hyperparameters for an objective function with constraints, according to some embodiments. Bayesian optimization starts at step 200 by determining an objective function to optimize. In some embodiments the objective function may be the validation error of a model 113 of a model training system 130 undergoing training as shown in FIG. 2, although this is not intended to be limiting and other objective functions can be envisioned. To optimize the objective function, a Bayesian optimizer, such as 150 of FIG. 1, may optimize hyperparameters 140 of the model training system 130 of FIG. 1 in order to minimize validation error. In addition, one or more constraints may be obtained, such as a latency constraint or memory usage constraint in various embodiments. In some embodiments, these one or more constraints may be specified using corresponding units of measure, for example a constraint on latency may be specified in units of time. In other embodiments, the one or more constraints may also be specified using standardized metrics, for example a constraint on latency may be specified as a percentile such as a ninetieth percentile (P90) latency. Such specifications are not intended to be limiting and any number of constraint specification techniques, including combinations of multiple specifications and formats, may be envisioned Constraints 112, as shown in FIG. 1, may be obtained via a programmatic interface 170 of FIG. 1 in some embodiments. Additionally, other information pertaining to the objective function, for example training data 111 for the model training system 130 as shown in FIG. 1, may also be obtained. Such objective functions and constraints, however, are not intended to be limiting and any number of objective functions and applicable constraints may be envisioned.

Once an objective function is determined and constraints obtained, optimization proceeds to step 210 where probabilistic models of the objective function and constraint functions are initialized. In some embodiments, initialization may include evaluation of the objective function at one or more points. In various ones of these embodiments, selection of initial points for evaluation may occur in a number of ways. For example, one of more points may be selected through a random search. Once individual ones of the initial points are evaluated, a set of operational metrics may be determined and provided to the Bayesian optimizer, for example the metrics 145 as shown in FIG. 1. These collective sets of metrics may be used to initialize the probabilistic models for use in the Bayesian optimizer 150.

Once the probabilistic models have been initialized, optimization proceeds to step 220 where one or more iterations of the optimizer are performed to refine the probabilistic models. First, values of hyperparameters are determined using the probabilistic functions and an acquisition function which considers the obtained constraints. In some embodiments, this acquisition function may implement constrained maximum value entropy search (cMES) as discussed herein. After determining hyperparameter values, the optimizer proceeds to step 230. Further detail of the identifying step 220 is provided in FIG. 4 below.

At step 230, the objective function is evaluated using the identified hyperparameters and metrics for objective function quality and constraints are obtained. In some embodiments, the objective function may involve a machine learning system, 130 and evaluation may include training the machine learning system using a training data set such as training data 111 as shown in FIG. 1. After evaluation is performed, a measure for quality of the objective function may be obtained. For example, a measure of validation error may be determined for the machine learning system after the system has been trained. In addition, operational constraint values may be determined. For example, in some embodiments measurements of execution performance of a trained model 113, as shown in FIG. 1, or execution latency of the trained model may be determined. In other embodiments, memory consumption of execution of the trained model may be determined while in still other embodiments memory consumption or processing requirements of the machine learning system may be determined. This determined set of metrics may then be used by the optimizer to refine the probabilistic models in step 240. Further detail of the updating step 240 is provided in FIG. 3 below.

Once the probabilistic models are updated in step 240, a determination may be made whether a stop condition for tuning has been satisfied. In some embodiments, this determination may be made using and evaluation of the determined set of metrics. In other embodiments, the determination may be made using an evaluation of the probabilistic models, while in still other embodiments the determination may be made using a predetermined number of iterations. Such decisions, however, are not intended to be limiting and any number of stop conditions may be imagined. If the stop condition is not satisfied, the optimization returns to step 220 to further refine the probabilistic models. Otherwise, the optimization proceeds to step 260.

In step 260, the optimization determines optimal hyperparameters using the refined probabilistic functions and the acquisition function. Optimization is then complete.

A hyperparameter tuning system, such as discussed above with regard to FIG. 1, or other optimization engine may perform the techniques discussed above with regard to FIG. 2. In some embodiments, the hyperparameter tuning system, or other optimization engine may be implemented as part of a machine learning system or service, as discussed below with regard to FIGS. 10 and 11. In some embodiments, the hyperparameter tuning system, or other optimization engine may be implemented as a standalone system or service (e.g., as a stand-alone network-based service).

Updating the Probabilistic Models

Figure 3:
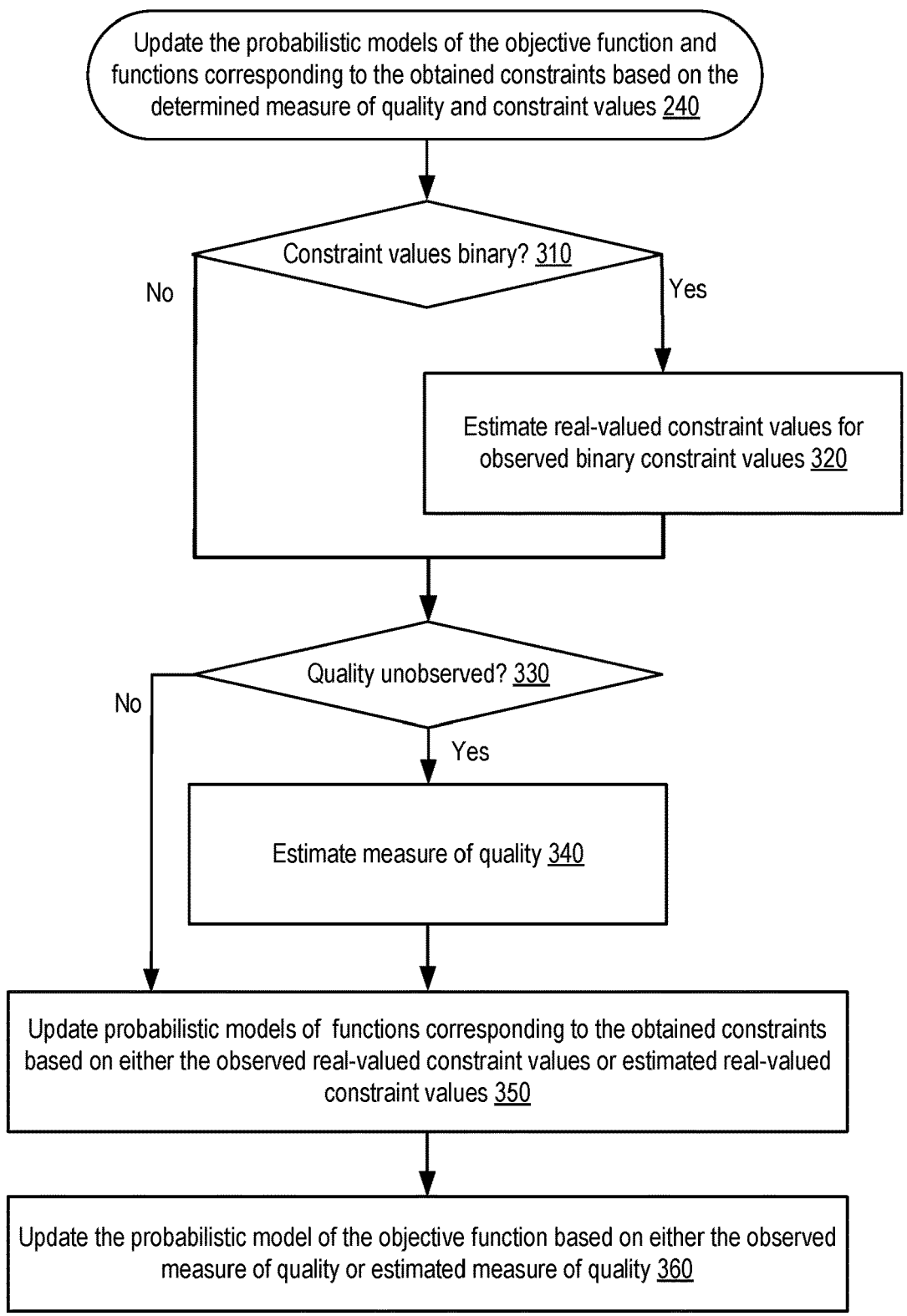
FIG. 3 is a high-level flowchart of updating probabilistic models of an objective function and constraint functions of an optimizer using determined measures of quality and constraints, according to some embodiments.

FIG. 3 is a high-level flowchart of updating probabilistic models of an objective function and constraint functions of a Bayesian optimizer using determined measures of objective function quality and operational constraints, according to some embodiments. The process starts when the evaluation of an objective function, such as the model training system 130 as shown in FIG. 1, has been evaluated and a set of metrics, such as metrics 145 of FIG. 1, corresponding to one or more hyperparameters have been determined. The process proceeds to step 310 where it is determined if one or more constraint values are binary. If no constraint values are binary, the process proceeds to step 330. Otherwise, the process proceeds to step 320.

At step 320, real-valued constraint values may be estimated based in part on the observed binary constraint values. These estimated real-valued constraint values may be used to update the corresponding probabilistic model later in step 350 below.

The process then proceeds to step 330 where a determination is made whether the quality of the objective function is unobserved as indicated by one or more of the binary constraint values. If the quality of the objective function is observed, the process proceeds to step 350. Otherwise, an estimate of the measure of quality of the objective function may be made in step 340 and this estimate may be used to update the probabilistic model of the objective function in step 360 below. The process then proceeds to step 350.

In step 350, the probabilistic models of the functions corresponding to the obtained constraints may be updated. These updates may use either observed real-valued measures resulting from the evaluation or estimated real-valued constraint values. Once the functions are updated the process proceeds to step 360.

In step 360, the probabilistic model of the objective function may be updated. This update may use either an observed measure resulting from the evaluation or an estimated value if it has been determined that the quality is unobserved. Once the function has been updated the process is complete.

Identifying Hyperparameter Values

Figure 4:
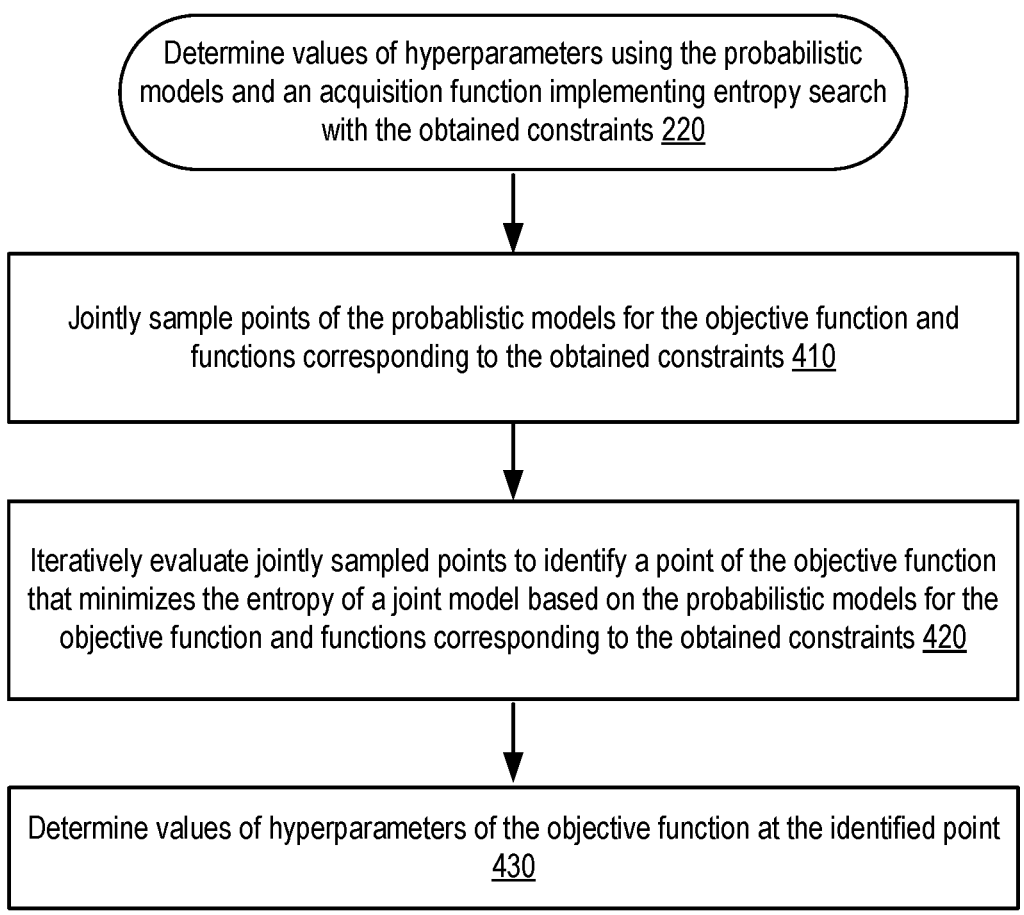
FIG. 4 is a high-level flowchart of identifying values of hyperparameters for an objective function using an acquisition function implementing entropy search using probabilistic models for the objective function and constraint functions, according to some embodiments.

FIG. 4 is a high-level flowchart of identifying values of hyperparameters for an objective function using an acquisition function implementing entropy search using probabilistic models for the objective function and constraint functions, according to some embodiments. The process begins at step 410 where the probabilistic models for the objective function and functions corresponding to the obtained constraints are jointly sampled. In some embodiments, this joint sampling may include sampling corresponding to values where one or more of the probabilistic models is least costly to evaluate. Once the probabilistic functions are jointly sampled, the process proceeds to step 420.

In step 420, the jointly sampled points of the probabilistic models are iteratively evaluated to identify a point of the objective function that minimizes the entropy of a joint model, the joint model based on the probabilistic models of the objective function and functions corresponding to the obtained constraints. Once a point is identified, the process proceeds to step 430 where values of hyperparameters at the identified point are determined. The process is then complete.

Joint Sampling

Figure 5:
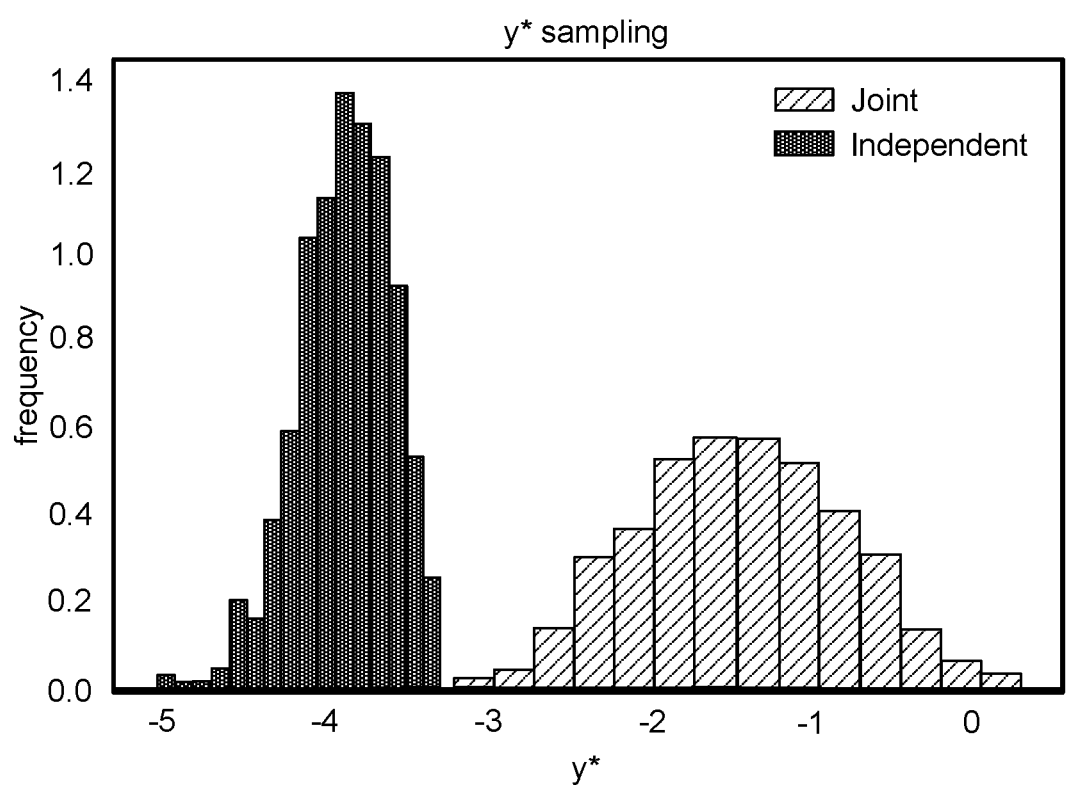
FIG. 5 is a chart of samples of a probabilistic model of an objective function obtained using joint and independent sampling methods, according to some embodiments.

Comparing Bayesian optimization for different variants of cMES using joint or marginal sampling of y* respectively, joint sampling leads to significantly better results. Y* when drawn under their independence assumption is under-biased as shown in FIG. 5 where the size of this bias is very significant. Importantly, bias gets worse the larger X is: y* diverges as |X| grows sufficiently large. This means that the regime of |X|, where the bias is small enough not to distort results, is likely small enough to allow for joint sampling. Meanwhile, for high-dimensional configuration spaces a discretization set of size |X|=2000 may prove insufficient and more complex approximations may necessary.

Analysis

Ten constrained hyperparameter optimization problems are considered spanning different acquisition algorithms, datasets and constraint modalities and results are summarized in FIGS. 6-9. The first six problems optimize for an accuracy metric (AUC for binary classification, coefficient of determination for regression), subject to a constraint on model size. Such configurations may be suitable for resource-constrained or mobile devices. The remaining four problems seek to minimize error on positives, subject to a limit on the error on negatives such as is relevant in medical domain applications.

The acquisition algorithms evaluated are cMES (as shown in 640, 750, 810, 920, 830, 910, 920 and 930), Adaptive Percentile (AP [as shown in 630 and 710]), constrained Expected Improvement (cEI [as shown in 620, 720, 740, 800 and 900), constrained Predictive Entropy Search (cPES [as shown in 610) and Random (as shown in 600 and 700). When sampling a problem, and then a hyperparameter configuration at random, feasible points were found with probability 51.5%. Also note that for all these problems, the overall global minimum point is unfeasible.

Each method is compared on the ten hyperparameter optimization problems using twenty random repetitions each. Each method was initialized with evaluations at five randomly sampled candidates. To account for the heterogeneous scales of the ten black-box functions and be able to compare the relative performance of the competing methods, results are aggregated based on the average rank where lower is better. Specifically, methods for the same hyperparameter optimization problem, iteration and random seed are ranked according to the best feasible value they observed so far, then are averaged over all these. Note that in initial rounds, some methods may not have made feasible observations. For example, if five of ten methods have feasible evaluations, then the former are ranked 1 through 5, while the latter are equally ranked (6+10)=2=8.

Figure 6:
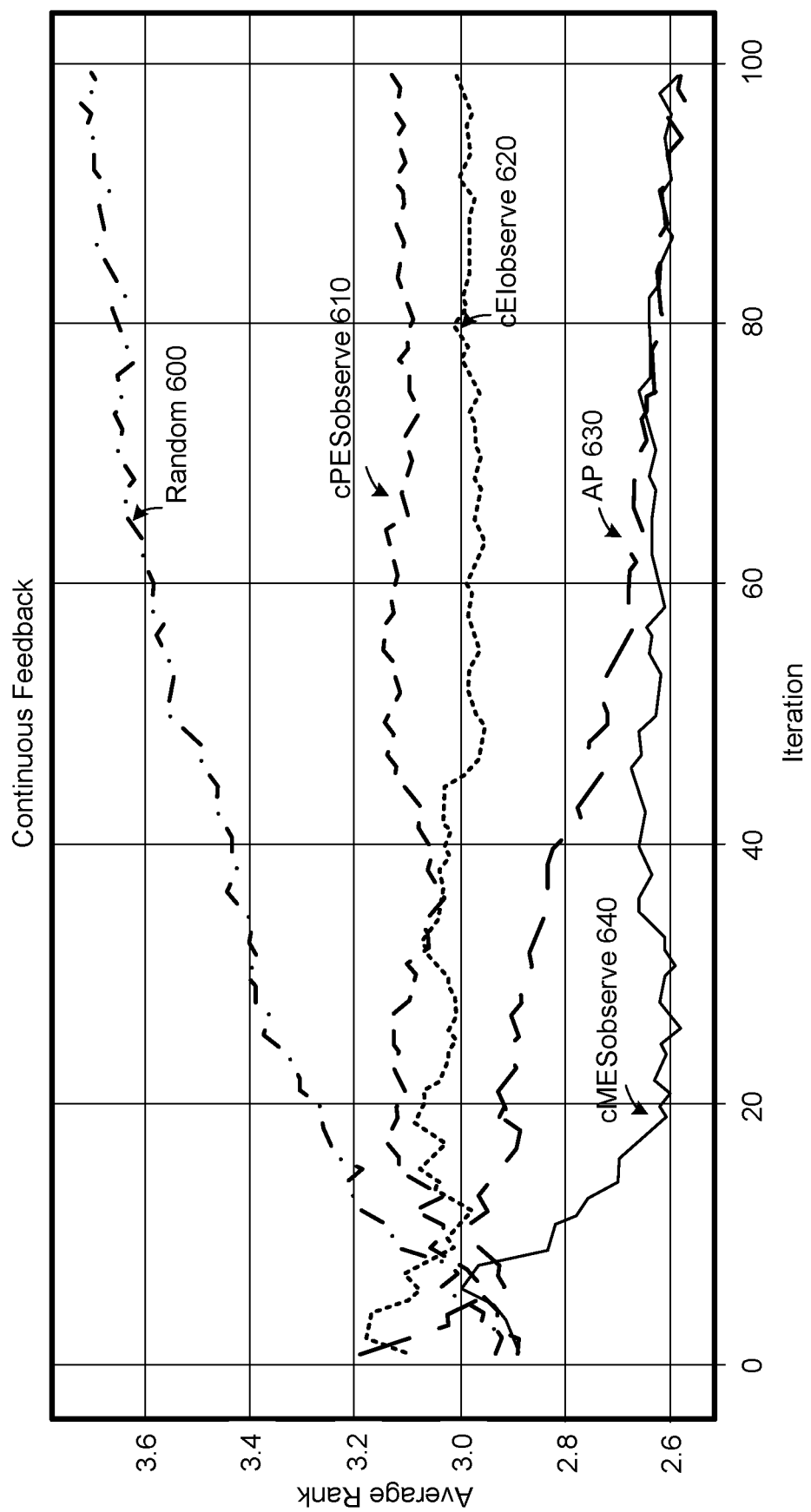
FIG. 6 is a chart comparing various acquisition functions with continuous feedback constraints, according to some embodiments.
Figure 7:
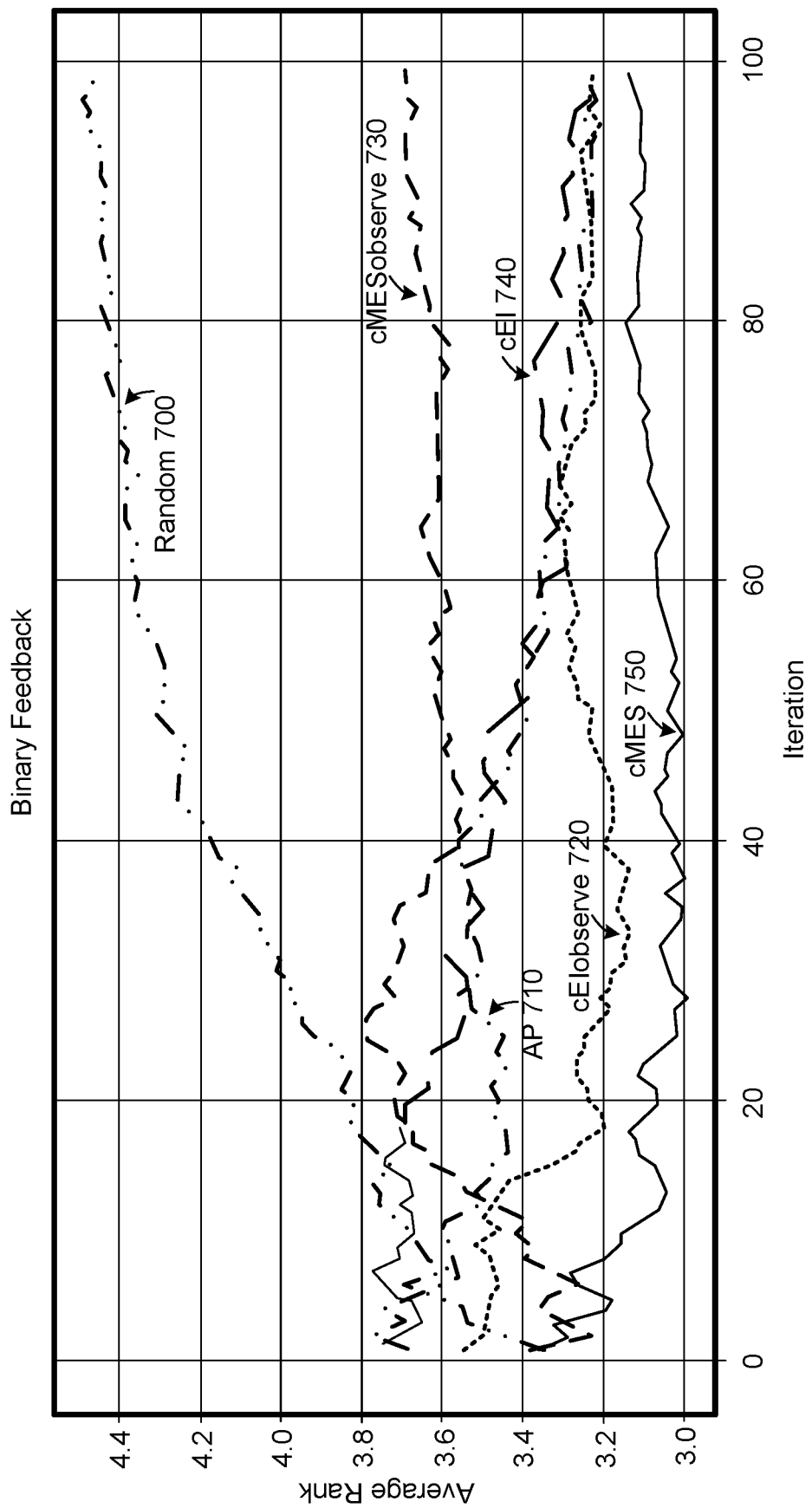
FIG. 7 is a chart comparing various acquisition functions with binary feedback constraints, according to some embodiments.

The results for the binary-feedback case in FIG. 7 point to a number of conclusions. First, among methods operating in the unobserved scenario, cMES achieves the best overall average rank. While cEI uses fewer unfeasible evaluations, it is overly conservative and tends to converge to worse optima. Second, the AP baseline for perc=100 is surprisingly effective, outperforming cEI. Third, using the value of y(•) in the unfeasible region, where the (unfeasible) global optimum resides, degrades performance for cMES. Finally, FIG. 7 shows that cMES (p=0:9) is particularly efficient in early iterations, outperforming all competing methods by a wide margin. Also compared are all previous methods as well as PESC in the standard real-valued feedback, observed-objective scenario. The results over the ten problems are summarized in FIG. 6 showing that cMES outperforms competing approaches.

All experiments with cMES draw the constrained optimum y* via joint sampling. To gain more insight into the "mean field" assumption of, cMES was also run on the 10 constrained optimization problems using their marginal sampling approach to draw y*. The average rankings are reported in Table 4, where the 10 samples of y* are drawn at each iteration either via marginal or joint sampling, both in the observed and unobserved-objective settings and a range of values of p. It is clear that marginal sampling degrades optimization performance across the board.

Figure 8:
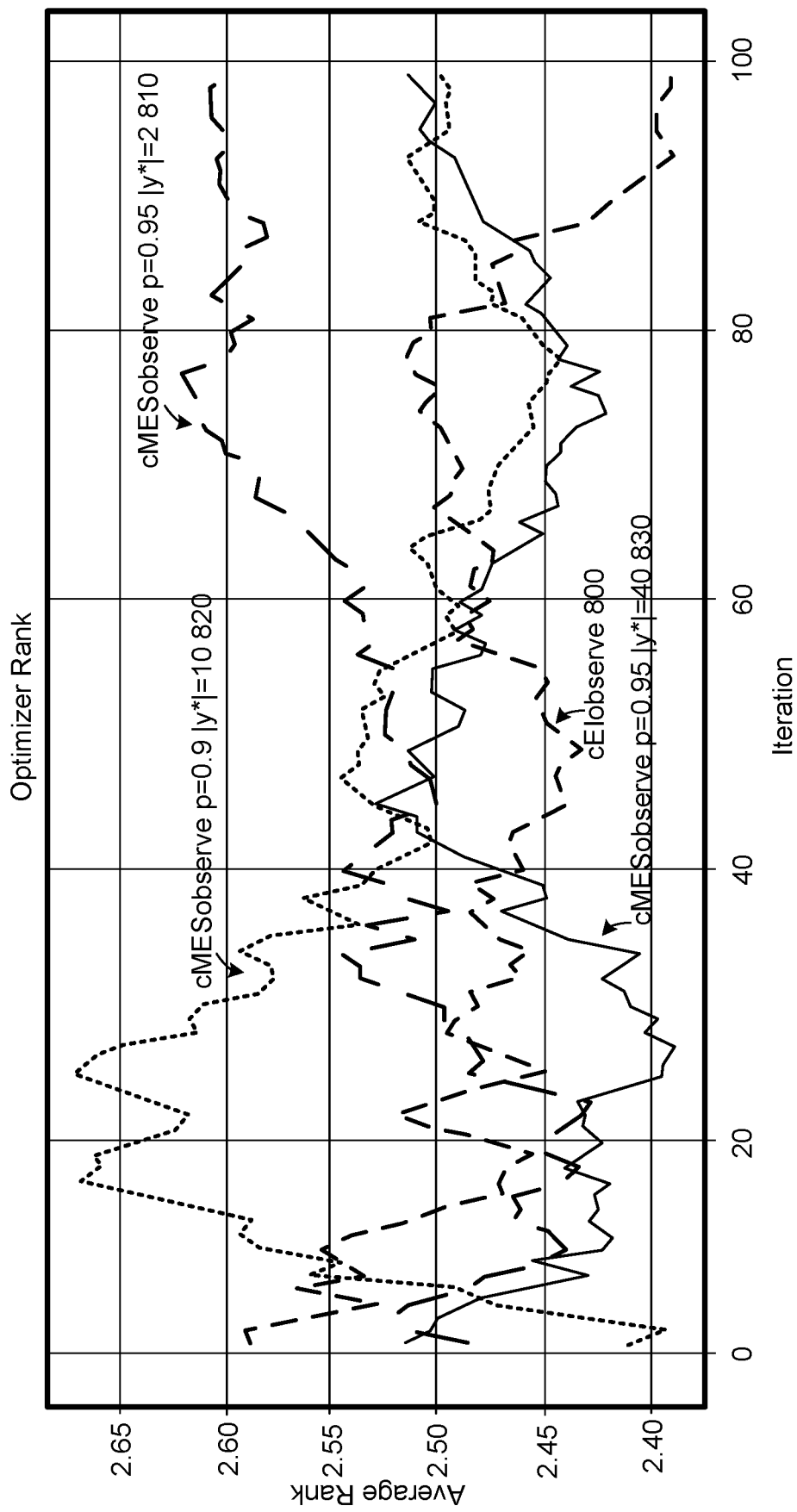
FIG. 8 is a chart comparing various acquisition functions with varying iterations and continuous feedback constraints, according to some embodiments.
Figure 9:
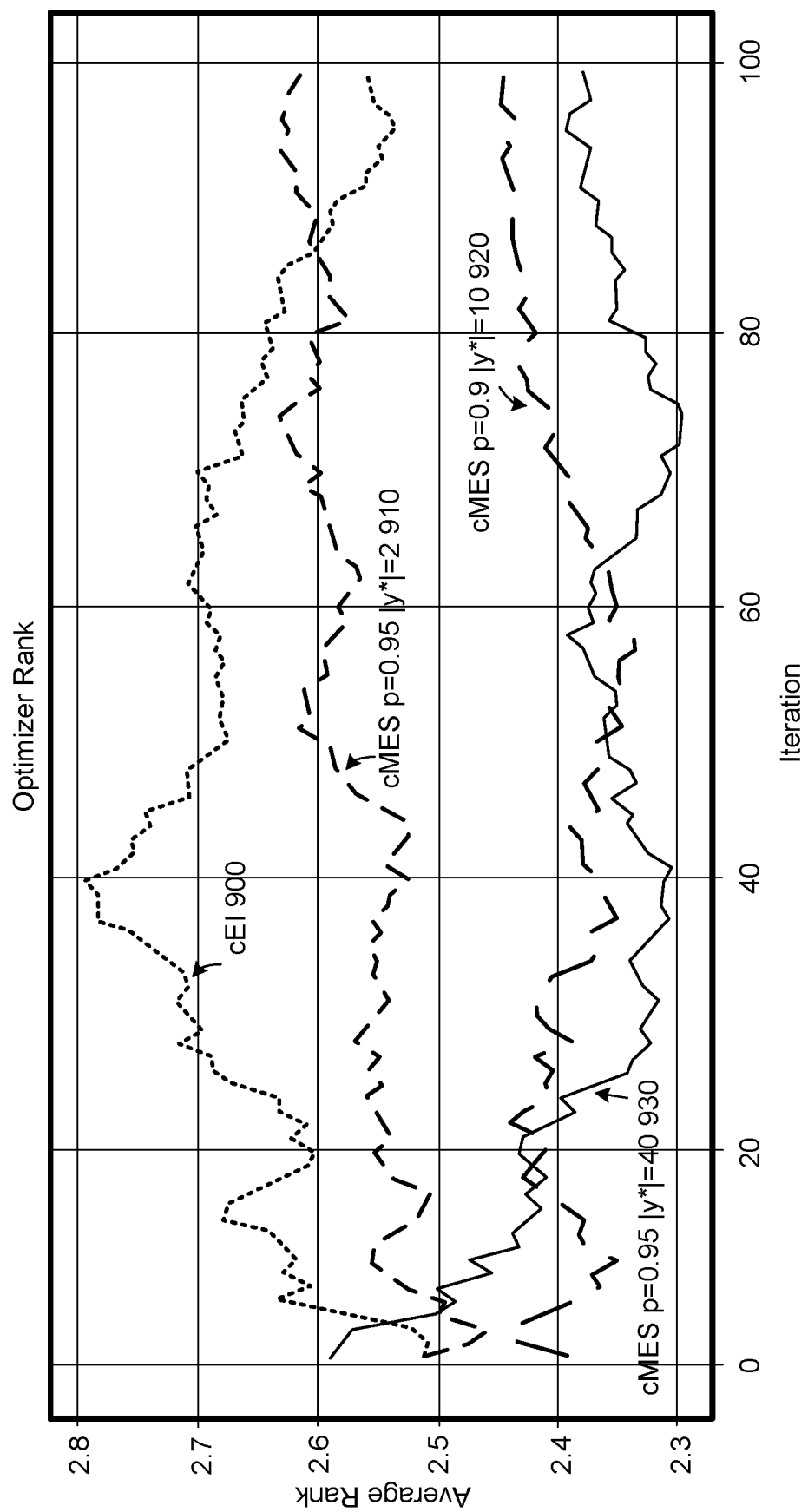
FIG. 9 is a chart comparing various acquisition functions with varying iterations and binary feedback constraints, according to some embodiments.

The impact of using increasing numbers of y* samples is also considered. Results summarized in FIG. 8 and FIG. 9 show that using more than ten samples of y* does not lead to improvement of the algorithm performance.

Programmatic Interactions

Figure 10:
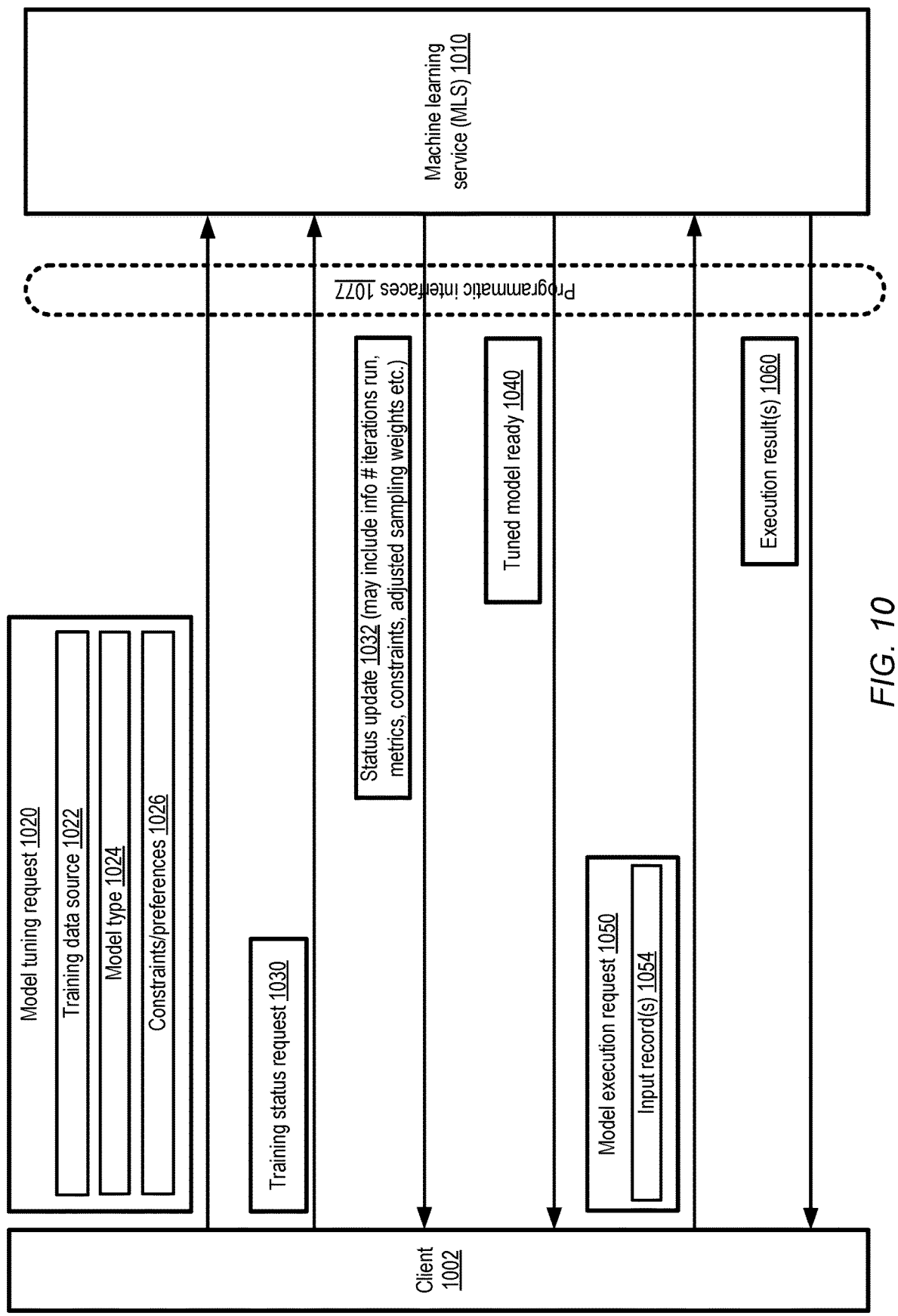
FIG. 10 illustrates example programmatic interactions between clients and a machine learning service at which Bayesian optimization of hyperparameters for an objective function with constraints may be used, according to at least some embodiments.

FIG. 10 illustrates example programmatic interactions between clients and a machine learning service at which Bayesian optimization of hyperparameters for an objective function with constraints may be used, according to at least some embodiments. The machine learning service 1010 may implement one or more programmatic interfaces 1077 in the depicted embodiment, such as a set of APIs, a web-based console, command-line tools, graphical user interfaces, and the like. Using such a programmatic interface, a client 1002 may submit a model tuning request 1020 the MLS 1010 in the depicted embodiment. The training request may indicate a training data source 1022, a model type 1024, and/or one or more constraints 1026 pertaining to the tuning of the model. The model type 1024 may, for example, indicate that a neural network model is to be trained. In some embodiments, the constraints 1026 may indicate required latency constraints for the resultant model. In at least one embodiment the client may indicate a target resource budget or time budget as a constraint for the training, and the MLS may determine whether adaptive sampling should be used during training based on such constraints. The client 1002 may submit model execution requests 1050 indicating one or more input records for which predictions are to be generated using the trained version of the model. The results 1060 of the model execution may be transmitted to the client 1002.

In some embodiments, during the training phase of the model, a training status request 1030 may be submitted periodically by the client 1002 to the MLS 1010. In response, a status update 1032 may be provided, indicating for example how many training iterations have been run, current status of determined metrics, such as quality of the objective function and operational constraint values, and/or the current sampling weights assigned to the different training examples. In at least one embodiment, such updated training status information may be provided using a visualization interface, which may be refreshed automatically. A response, reply, or other indication may be provided via interface 1077 that the model has been tuned (e.g., a trained model with optimal performance and constraint evaluations has been generated and identified) is ready or otherwise available for execution, as indicated at 1040.

Provider Network Environment

Figure 11:
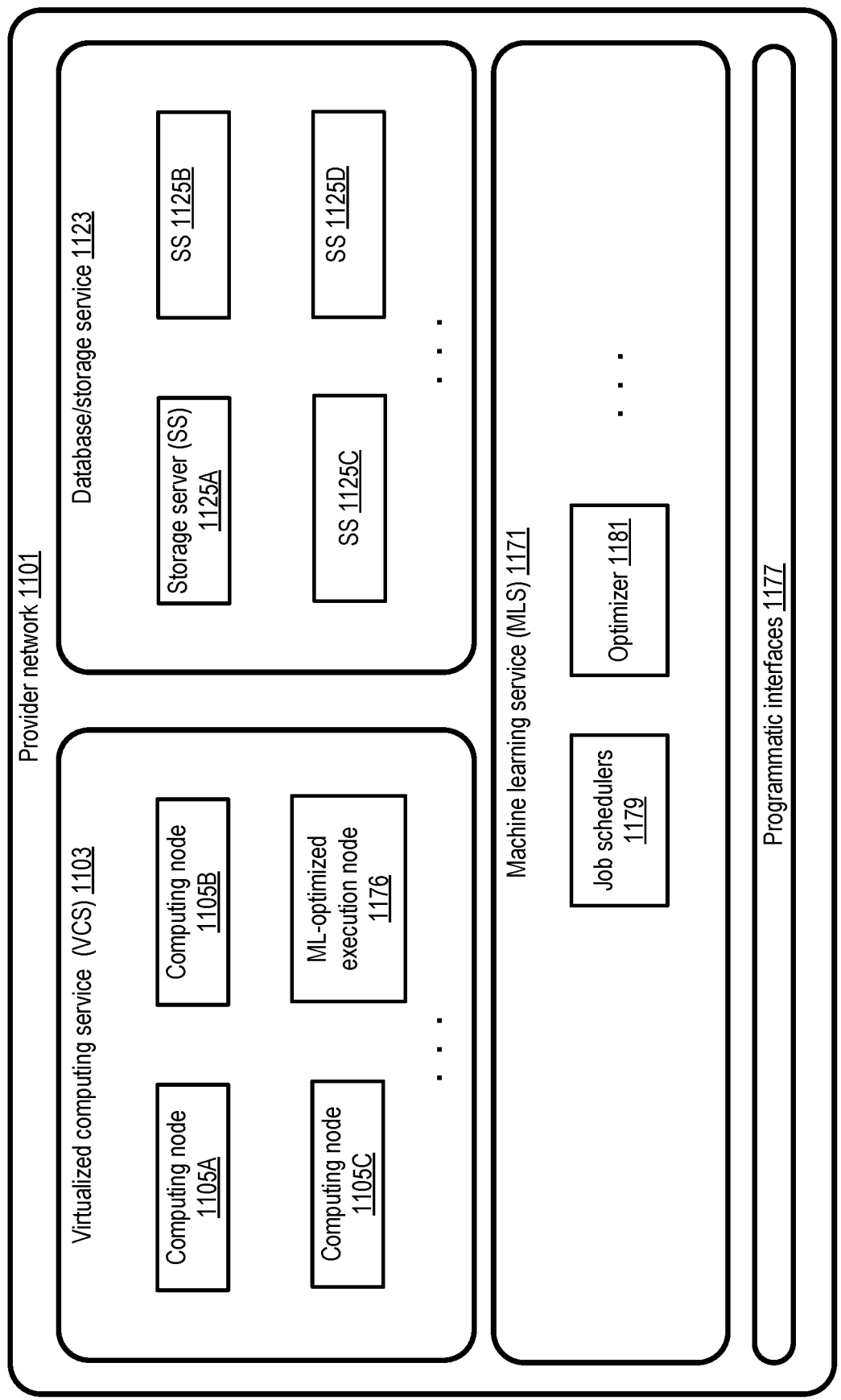
FIG. 11 illustrates a provider network environment at which Bayesian optimization of hyperparameters for training of a machine learning system may be implemented, according to at least some embodiments.

In some embodiments, the techniques discussed above for Bayesian optimization of hyperparameters for an objective function with constraints may be implemented at a provider network. FIG. 11 illustrates a provider network environment at which a Bayesian optimization of hyperparameters for an objective function with constraints may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 1101 may comprise resources used to implement a plurality of services, including for example a virtual computing service (VCS) 1103, a database or storage service 1123, and a machine learning service (MLS) 1171. Components of a given service may utilize components of other services in the depicted embodiment—e.g., for some machine learning tasks, a component of the machine learning service 1171 may utilize virtual machines implemented at computing nodes such as 1105A-1105C and ML-optimized execution node 1176 of the virtualized computing service. Input data, intermediate results, final results and/or other artifacts of various machine learning algorithms or models, such as models using randomized learning algorithms for which Bayesian optimization of hyperparameters may be employed, may be stored at storage servers 1025 (e.g., 1125A-1125D) of the database or storage service 1123 in some embodiments. Individual ones of the services shown in FIG. 11 may implement a respective set of programmatic interfaces 1177 which can be used by external and/or internal clients (where the internal clients may comprise components of other services) in the depicted embodiment.

In some embodiments, requests to train some types of machine learning models may be handled as batch jobs at the machine learning service, and a batch job scheduler 1179 may orchestrate the allocation of resources for the jobs as well as dependencies among jobs. In the depicted embodiment, entries of a Bayesian optimizer 1181 for the MLS 1171 may be employed, for example, to optimize hyperparameter values. In at least one embodiment, a machine learning service 1171 may have access to or include a set of execution nodes 1176 that are optimized for machine learning tasks (e.g., nodes that have customized hardware such as GPU arrays and/or customized software stacks). Depending on the suitability of such nodes for the models being trained using adaptive sampling, one or more execution nodes 1176 may be employed for training and/or executing such models in the depicted embodiment.

In at least some embodiments, the techniques discussed earlier for Bayesian optimization of hyperparameters for an objective function with constraints may be implemented using non-specialized computing nodes of the virtualized computing service 1103. In some embodiments, the techniques described above may be implemented without acquiring resources of network-accessible services such as those shown in FIG. 11. For example, a standalone tool implemented at one or more computing devices which are not part of a network-accessible service may be used in some embodiments.

Illustrative Computer System

Figure 12:
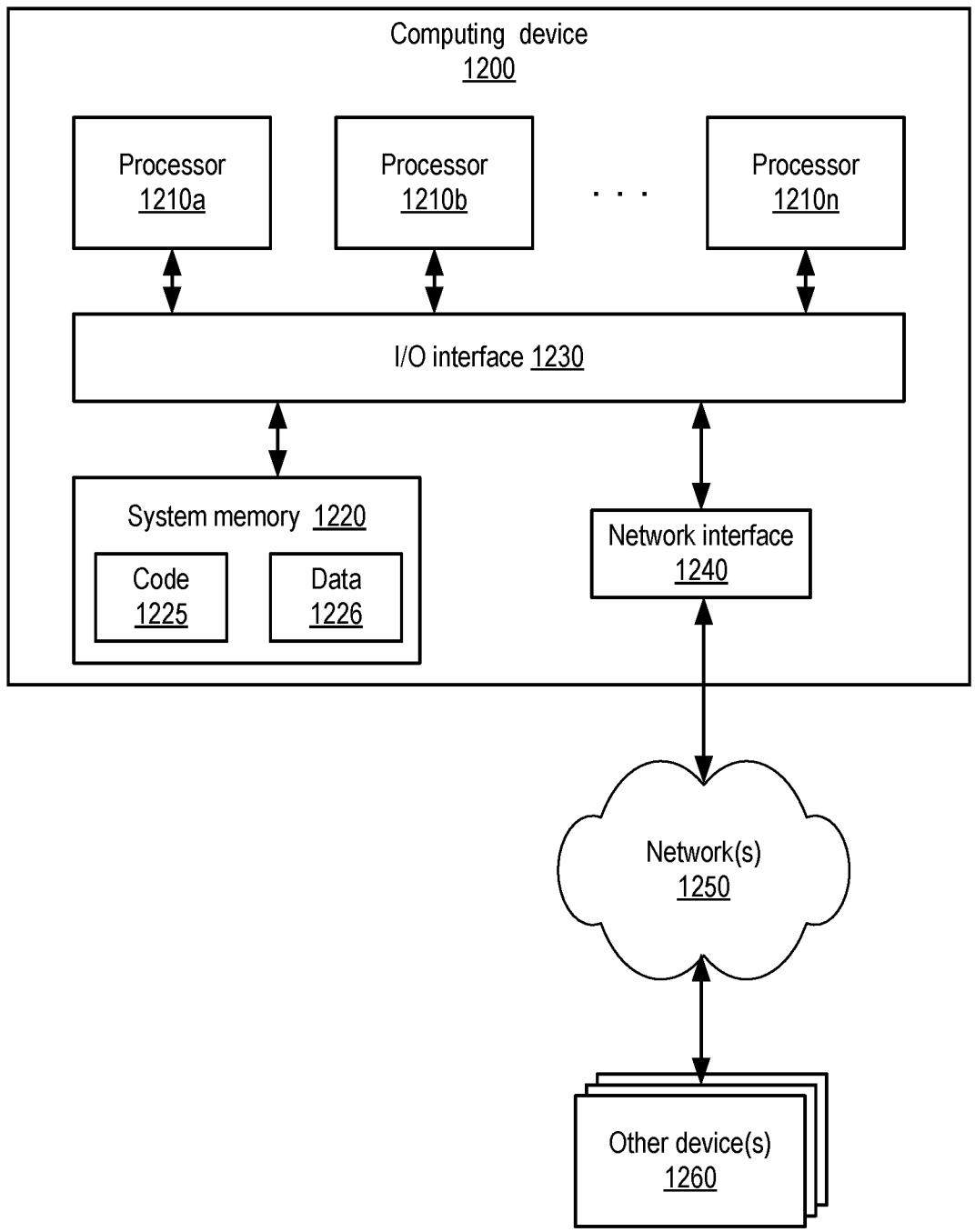
FIG. 12 is a block diagram illustrating an example computing device that may be used in at least some embodiments.

In at least some embodiments, a server that implements a portion or all of one or more of the technologies described herein, including optimizing hyperparameters for training and executing machine learning models, may include a general-purpose computer system that includes or is configured to access one or more computer-accessible media. FIG. 12 illustrates such a general-purpose computing device 1200. In the illustrated embodiment, computing device 1200 includes one or more processors 1210 coupled to a system memory 1220 (which may comprise both non-volatile and volatile memory modules) via an input/output (I/O) interface 1230. Computing device 1200 further includes a network interface 1240 coupled to I/O interface 1230.

In various embodiments, computing device 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. In some implementations, graphics processing units (GPUs) may be used instead of, or in addition to, conventional processors.

System memory 1220 may be configured to store instructions and data accessible by processor(s) 1210. In at least some embodiments, the system memory 1220 may comprise both volatile and non-volatile portions; in other embodiments, only volatile memory may be used. In various embodiments, the volatile portion of system memory 1220 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces such as various types of persistent and/or volatile storage devices. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, such as other computer systems or devices as illustrated in FIG. 1 and FIG. 11, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIG. 1 and FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of methods may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    at least one processor; and
    a memory, storing program instructions that when executed cause the at least one processor to implement a machine learning system, configured to:
        receive a request to tune one or more hyperparameters for a machine learning model according to an operational latency constraint of the machine learning model;
        tune respective values of the one or more hyperparameters of the machine learning model based, at least in part, on the operational latency constraint to train a version of the machine learning model with the respective values of the tuned one or more hyperparameters, wherein to tune the respective values of the one or more hyperparameters, the machine learning system is configured to:
            iteratively perform until a measure of an operational metric corresponding to the operational latency constraint satisfies the operational latency constraint and a measure of accuracy satisfies an accuracy constraint:
                select respective values of the one or more hyperparameters based at least in part on respective probabilistic models of accuracy of the machine learning model and the operational metric of the machine learning model corresponding to the operational latency constraint using a training data set and an acquisition function for Bayesian optimization, the acquisition function implementing an entropy search with the operational latency constraint;
                train the machine learning model with the respective values of the one or more hyperparameters to determine the measure of accuracy and the measure of the operational metric corresponding to the operational latency constraint; and
                update, based on the measure of accuracy and the measure of the operational metric, the respective probabilistic models of accuracy of the machine learning model and the operational metric of the machine learning model corresponding to the operational latency constraint; and
            store a machine learning model trained using one or more optimized hyperparameters determined at least in part on the respective probabilistic models of accuracy of the machine learning model and the operational metric corresponding to the operational latency constraint using the training data set and the acquisition function.

2. The system of claim 1, wherein the entropy search is a maximum value entropy search.

3. The system of claim 1, wherein the respective probabilistic models are Gaussian process models.

4. The system of claim 1, wherein machine learning system is a machine learning service offered by a provider network, and wherein the request to tune the one or more hyperparameters for the machine learning model is received via an application programming interface implemented for the machine learning service offered by the provider network.

5. A method, comprising:
receiving a latency constraint on operation of an objective function via an interface for a hyperparameter tuning system;
selecting, by the hyperparameter tuning system, respective values of one or more hyperparameters of the objective function based at least in part on respective probabilistic models of the objective function and a function corresponding to the latency constraint using an acquisition function implementing an entropy search with the latency constraint;
training, by the hyperparameter tuning system, the objective function according to the respective values of the one or more hyperparameters to determine a plurality of metrics comprising a measure of quality of the objective function and an operational constraint value for the latency constraint, wherein the plurality of metrics satisfy a stop condition for hyperparameter tuning; and
updating, by the hyperparameter tuning system, the respective probabilistic models of the objective function and the latency constraint to obtain updated probabilistic models of the objective function and the function corresponding to the latency constraint based on the measure of quality of the objective function and the operational constraint value.

6. The method of claim 5, wherein the objective function comprises a validation error of a machine learning model using a training data set.

7. The method of claim 6, further comprising receiving the training data set via an application programming interface.

8. The method of claim 5, wherein the entropy search is a maximum value entropy search.

9. The method of claim 5, wherein the one or more constraints comprise a binary constraint and wherein determining a measure of respective constraint values for the one or more received constraints comprises estimating a real-valued constraint value based in part on a determination of a binary constraint value.

10. The method of claim 5, wherein determining the measure of quality of the objective function comprises estimating the measure of quality of the objective function responsive to a determination that the measure of quality of the objective function is unobservable through evaluating the objective function configured according to the determined values of the one or more hyperparameters.

11. The method of claim 5, wherein the hyperparameter tuning system is implemented as part of a machine learning service offered by a provider network, and wherein the interface is an application programming interface implemented by the machine learning service offered by the provider network.

12. A system, comprising:
at least one processor and a memory storing program instructions that when executed cause the at least one processor to implement a network-based service configured to:
expose an application programming interface for an optimizer that tunes hyperparameters for different machine learning models;
receive a request to tune one or more hyperparameters of a machine learning model via the application programming interface, the request comprising a latency constraint on operation of the machine learning model;
tune, by the optimizer, respective values of the one or more hyperparameters of the machine learning model based, at least in part, on the latency constraint to train a version of the machine learning model with the respective values of the one or more hyperparameters tuned by the optimizer, wherein to tune the respective values the network-based service is configured to iteratively perform until a measure of an operational metric corresponding to the operational latency constraint satisfies the operational latency constraint and a measure of accuracy satisfies an accuracy constraint:
select respective values of the one or more hyperparameters based at least in part on respective probabilistic models of accuracy of the machine learning model and the operational metric of the machine learning model corresponding to the operational latency constraint using a training data set and an acquisition function for Bayesian optimization, the acquisition function implementing an entropy search with the operational latency constraint;
train the machine learning model with the respective values of the one or more hyperparameters to determine the measure of accuracy and the measure of the operational metric corresponding to the operational latency constraint; and
update, based on the measure of accuracy and the measure of the operational metric, the respective probabilistic models of accuracy of the machine learning model and the operational metric of the machine learning model corresponding to the operational latency constraint; and
provide, by the network-based service, an indication that the version of the machine learning model trained according to the one or more hyperparameters tuned by the optimizer is available, wherein the version of the machine learning model trained according to the one or more hyperparameters tuned by the optimizer satisfies an operational measure of accuracy and an operational latency constraint.

13. The system of claim 12, wherein at least some of the respective probabilistic models are Gaussian process models.

14. The system of claim 12, wherein the network-based service is further configured to:
send the determined measure of the operational metric responsive to a request received via the application programming interface.

15. The system of claim 14, wherein the entropy search is a maximum value entropy search.

16. The system of claim 14, wherein the request comprises a different constraint in addition to the latency constraint, wherein the tuning of the one or more hyperparameters is further based on the different constraint.

17. The system of claim 16, wherein the network-based service is a machine learning service offered by a provider network.

* * * * *